US008018087B2

(12) United States Patent
Ito et al.

(10) Patent No.: US 8,018,087 B2
(45) Date of Patent: Sep. 13, 2011

(54) VEHICULAR LAMP

(75) Inventors: Masayasu Ito, Shizuoka (JP); Fuminori Shiotsu, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 252 days.

(21) Appl. No.: 12/269,909

(22) Filed: Nov. 13, 2008

(65) Prior Publication Data

US 2009/0129111 A1 May 21, 2009

(30) Foreign Application Priority Data

Nov. 20, 2007 (JP) ................................ 2007-300311

(51) Int. Cl.
*B60L 3/00* (2006.01)
*H02J 1/00* (2006.01)

(52) U.S. Cl. ........................................ 307/10.1; 307/36

(58) Field of Classification Search .................... 307/36, 307/10.1
See application file for complete search history.

(56) References Cited

U.S. PATENT DOCUMENTS 7,301,784 B2 * 11/2007 Murakami et al. ......... 363/21.01
7,852,009 B2 * 12/2010 Coleman et al. ........... 315/185 S
2007/0171145 A1 * 7/2007 Coleman et al. ................ 345/39
2008/0111501 A1 * 5/2008 Dobbins et al. ............... 315/294

FOREIGN PATENT DOCUMENTS

CN 101144609 3/2008
JP 2001-216803 8/2001

* cited by examiner

*Primary Examiner* — Michael Rutland Wallis
(74) *Attorney, Agent, or Firm* — Fish & Richardson P.C.

(57) ABSTRACT

A vehicular lamp is arranged to save power by not driving a cooling fan when an LED is unlit. The vehicular lamp is capable of reducing cost and stopping a supply of current to the LED even in the case of open wiring in a supply of current to the cooling fan. The vehicular lamp includes LEDs connected in series, a cooling fan connected in series with the LEDs and arranged to cool the LEDs. A current supply circuit receives power supplied from a power source and supplies current to the LEDs and the cooling fan.

4 Claims, 4 Drawing Sheets

VEHICULAR LAMP

CROSS-REFERENCE TO RELATED APPLICATION(S)

The present application claims the benefit of priority of Japanese Patent Application No. 2007-300311, filed on Nov. 20, 2007. The disclosure of that application is incorporated herein by reference.

TECHNICAL FIELD

The present disclosure relates to controlling driving of a cooling fan that prevents lighting of a semiconductor light source structured from a semiconductor light-emitting element in a vehicular lamp and suppresses heat generated by the semiconductor light source.

BACKGROUND

A known illumination device is equipped with a cooling fan and a light-emitting diode (LED) acting as a semiconductor light source. The cooling fan prevents the temperature of the LED from increasing as the result of heat generated by the LED. The illumination device also is mounted with a fan drive circuit that rotationally drives and controls the cooling fan, and with an LED drive circuit that drives and controls the LED.

The cooling fan is provided on a back surface of a plurality of LEDs and is equipped with a rotatable propeller. Wind generated by rotational driving of the propeller in the cooling fan is sent to the LED side, thereby preventing the temperature of the LED itself from increasing (see, e.g., Japanese Patent Application Laid-Open (Kokai) No. 2001-216803).

Application of the above illumination device to a vehicular lamp contributes to lengthening the life of the semiconductor light source and is, therefore, suitable for reducing the number of times the semiconductor light source must be replaced.

SUMMARY

According to the foregoing application, the fan drive circuit and the LED drive circuit are separately mounted. Therefore, when cooling the LED using the cooling fan, the cooling fan continues to drive not only when the LED is lit, but also when the LED is unlit.

However, when the LED is unlit, the LED does not generate heat and there is no need to drive the cooling fan. Accordingly, the foregoing application can result in unnecessary energy consumption. In other words, from the standpoint of saving power, the cooling fan should be driven only when the LED is lit, and the cooling fan preferably is not driven when the LED is unlit. As the cooling fan of the foregoing application continues to drive even when the LED is unlit, power cannot be saved, and the life of the cooling fan is shortened.

For example, when the wiring for a current supply to the cooling fan is open, current is only supplied to the LED, whereby the LED continues to generate heat. In such a situation, the supply of current to the LED must be stopped in order to improve the durability of the LED. However, in the foregoing application, the continuous generation of heat by the LED shortens the life of the LED regardless of whether the cooling fan is driven.

To address the foregoing problem, separate components are needed to monitor the driving state of the cooling fan and the lighting state of the LED, and to control the cooling fan and the LED depending on the results of the monitoring. This leads to an increased number of parts, however, making it difficult to achieve a vehicular lamp at lower cost.

The present invention achieves, in some implementations, a vehicular lamp capable of stopping a supply of current to an LED, without requiring an increase in cost, even in the case of open wiring in a supply of current to a cooling fan.

A vehicular lamp according to a first aspect of the present invention includes: a semiconductor light source; a fan that is connected in series with the semiconductor light source and cools the semiconductor light source; and a current supply circuit that receives power supplied from a power source and supplies current to the semiconductor light source and the fan.

The current supply circuit preferably includes: a switch element that is connected in parallel with the fan, and supplies current to the semiconductor light source and the fan during an OFF operation, while bypassing only the fan and stopping a supply of current to be provided to the fan during an ON operation; and a switch drive circuit that drives the switch element, wherein a duty ratio of the switch element is set such that a magnitude of an average current to be provided to the fan is equal to or less than a predetermined rated current.

The current supply circuit preferably has a current detection circuit that detects an output current to be supplied from the current supply circuit, wherein the current supply circuit controls so as to stop the output current if a state in which a magnitude of the output current detected by the current detection circuit is less than a preset threshold value continues for a predetermined reference time, and the reference time is less than an OFF operation time of the switch element.

Various implementations provide one or more of the following advantages. For example, a drive circuit driving the cooling fan and a drive circuit driving the semiconductor light source can be used in common to achieve a reduction in the number of parts. In addition, the cooling fan is not driven when the semiconductor light source is unlit, thereby saving power.

In addition, the current supplied to the semiconductor light source can limit an average current to be supplied to the cooling fan to equal to or less than an rated current of the cooling fan.

Even in the case of open wiring in a supply of current to a cooling fan, it is possible to stop a supply of current to the semiconductor light source and prevent a failure resulting from a temperature increase of the semiconductor light source, without requiring an increase in cost.

DETAILED DESCRIPTION

Figure 1:
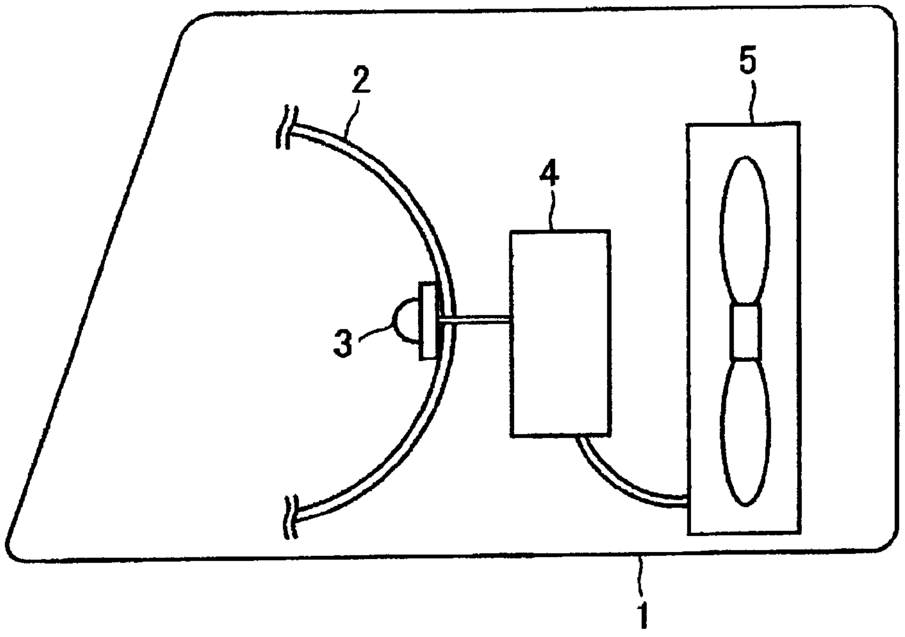
FIG. 1 shows an example of the schematic structure of a vehicular lamp according to the present invention.

FIG. 1 shows an example of a schematic structure of a vehicular lamp according to the present invention. FIG. 1 shows a basic structure that is common to all the vehicular lamps according to first to third embodiments described below.

As illustrated in FIG. 1, a vehicular lamp 1 includes an LED 3 as a semiconductor light source; a current supply circuit 4 that supplies current to drive and control a load; and a cooling fan 5.

The LED 3 is mounted on an inner side of a reflector 2. The LED 3 is connected with the current supply circuit 4, and is driven by a constant current (called an "LED current" below) supplied from the current supply circuit 4. The current supply circuit 4 is provided on a back surface side of the reflector 2, and is connected with the cooling fan 5 on the back surface side of the reflector 2. The cooling fan 5 is driven by a constant current (called a "fan current" below) supplied from the current supply circuit 4.

The cooling fan 5 blows air directly toward the LED 3 and the current supply circuit 4 within the vehicular lamp 1, or circulates air inside the vehicular lamp 1, whereby the temperature inside the vehicular lamp 1 is prevented from experiencing localized increases as the result of heat generated by the LED 3 and the current supply circuit 4.

Figure 2:
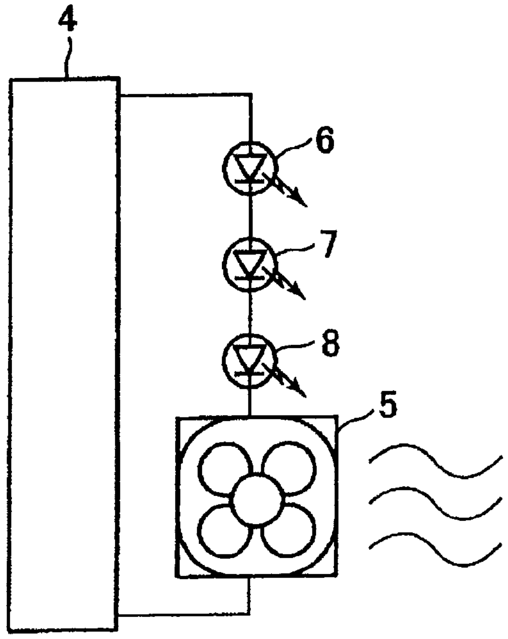
FIG. 2 shows the structure of the vehicular lamp according to a first embodiment of the present invention.

FIG. 2 shows the structure of the vehicular lamp according to the first embodiment of the present invention.

The current supply circuit 4 is driven and controlled so as to send the LED current to LEDs 6, 7, 8. A circuit form of the current supply circuit 4 is not limited, and the current supply circuit 4 can include, for example, a switching regulator or a series regulator. The three LEDs 6, 7, 8 are connected in series, although the number of LEDs is not limited to three. The cooling fan 5 is connected in series with the LEDs 6, 7, 8.

Supplying the LED current to the LEDs 6, 7, 8 by the current supply circuit 4 drives and lights the LEDs 6, 7, 8. If the LEDs 6, 7, 8 are driven and lit, the fan current also is sent to the cooling fan 5, and the cooling fan 5 is driven rotationally at the same time the LEDs 6, 7, 8 are driven. The current supply circuit 4 stopping the supply of the LED current to the LEDs 6, 7, 8 stops driving of the LEDs 6, 7, 8, and the LEDs 6, 7, 8 turn OFF. If the LEDs 6, 7, 8 turn OFF, the supply of the fan current to the cooling fan 5 also is stopped, and the cooling fan 5 stops rotationally driving at the same time the LEDs 6, 7, 8 stop driving.

In cases where an open abnormality such as a short circuit occurs in the LEDs 6, 7, 8, the supply of fan current to the cooling fan 5 is stopped and rotational driving of the cooling fan 5 is stopped. Using the foregoing structure as explained above, even if the LEDs 6, 7, 8 experience an open abnormality, it is possible to avoid a situation where the cooling fan 5 still continues rotational driving.

In cases where an open abnormality, such as a short circuit, occurs in the cooling fan 5, the supply of current to the LEDs 6, 7, 8 is stopped and the LEDs 6, 7, 8 turn OFF. According to the foregoing structure as explained above, even if the cooling fan 5 experiences an open abnormality, it is possible to avoid a situation where the LEDs 6, 7, 8 are still lit and continue to generate heat.

Figure 3:
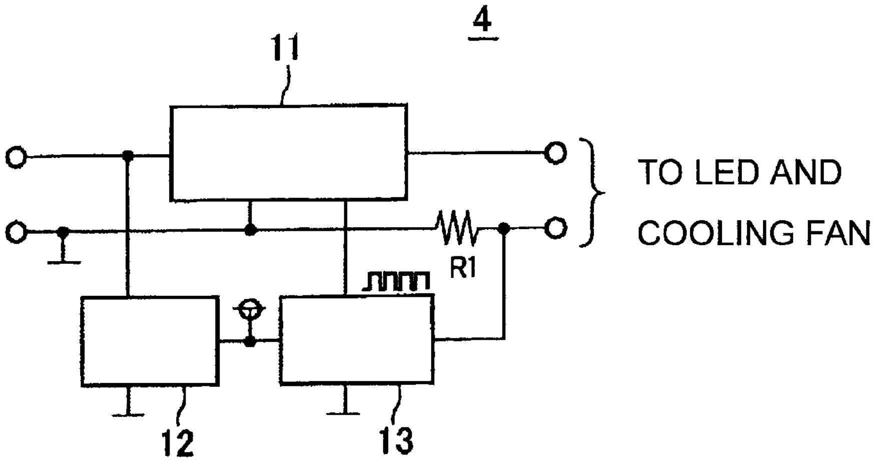
FIG. 3 shows the structure of a current supply circuit.
Figure 4:
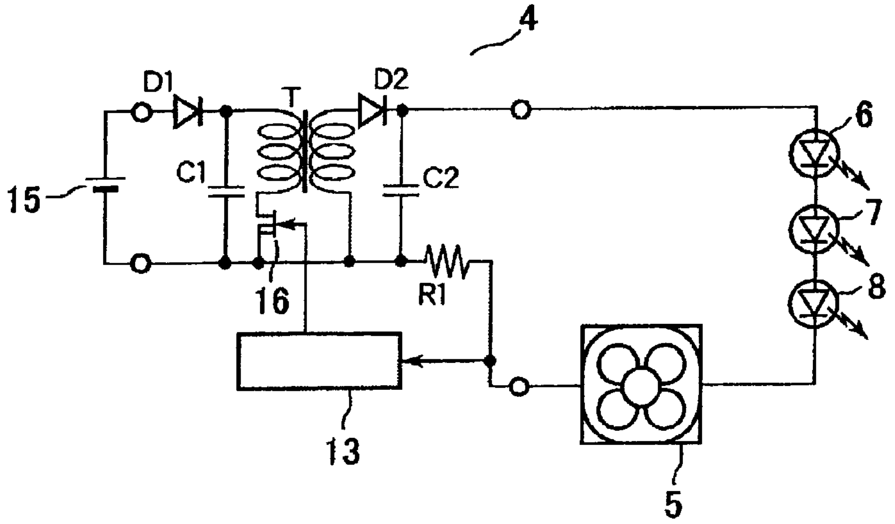
FIG. 4 is a view for explaining the structure of a switching regulator provided in the current supply circuit.

The structure of the current supply circuit 4 is now explained. FIG. 3 shows the structure of the current supply circuit. FIG. 4 is a view for explaining the structure of the switching regulator provided in the current supply circuit.

The current supply circuit 4, as illustrated in FIG. 3, includes a switching regulator 11 acting as an element of the vehicle lamp (light-emitting device) 1; a control power source 12; and a control circuit 13 used as current supply control means for sending an ON/OFF signal so as to operate the switching regulator 11 ON and OFF, and controlling a current to the LEDs 6, 7, 8. The control power source 12 functions to operate the control circuit 13.

As FIG. 4 shows, the LEDs 6, 7, 8 are connected in series with an output side of the switching regulator 11 (see FIG. 3) and serve as a semiconductor light source made of a semiconductor light-emitting element. The LEDs 6, 7, 8 can serve as the light source of various vehicular lamps such as a head lamp, stop and tail lamps, a fog lamp, or a turn signal lamp.

The switching regulator 11, as shown in FIG. 4, includes a transformer T, a condenser C1 an NMOS transistor 16, diodes D1, D2, and a condenser C2. A primary side of the transformer T is connected in parallel with the condenser C1 and connected in series with the NMOS transistor 16. An end side of the condenser C1 is connected to a positive terminal of an onboard battery (a DC power source) 15 via the diode D1, and another end side is connected to a negative terminal of the onboard battery 15. The drain of the NMOS transistor 16 is connected with the primary side of the transformer T, its source is connected with the negative terminal of the onboard battery 15, and its gate is connected with the control circuit 13. A secondary side of the transformer T is connected in parallel with the condenser C2 via the diode D2. A connection point between the diode D2 and the condenser C2 is connected with an anode side of the LED 6. An end side on the secondary side of the transformer T and an end side of the condenser C2 are connected to a cathode side of the LED 8 via a shunt resistance R1 and the cooling fan 5. The connection point between the shunt resistance R1 and the cooling fan 5 is connected with the control circuit 13. The shunt resistance R1 serves as current detecting means for detecting a current supplied to the LEDs 6, 7, 8. A voltage generated at both ends of the shunt resistance R1 is fed back to the control circuit 13 as a current for the LEDs 6, 7, 8.

The NMOS transistor 16 serves as a switch element that operates ON and OFF in response to an ON/OFF signal (a switching signal) from the control circuit 13. When the NMOS transistor 16 is operated ON, an input voltage from the onboard battery 15 is accumulated in the transformer T as electromagnetic energy. When the NMOS transistor 16 is operated OFF, the electromagnetic energy accumulated in the transformer T is discharged from the secondary side of the transformer T as emission energy to the LEDs 6, 7, 8 via the diode D2.

In other words, the switching regulator 11 serves as current supply control means for receiving a supply of current from the control circuit 13 and the onboard battery 15 to control a supply of current to the LEDs 6, 7, 8. In such case, the switching regulator 11 operates to compare a drop voltage of the shunt resistance R1 with a specified voltage (a threshold value) specified in advance, and to control an output current output to the LEDs 6, 7, 8 in accordance with the comparison result.

Figure 5:
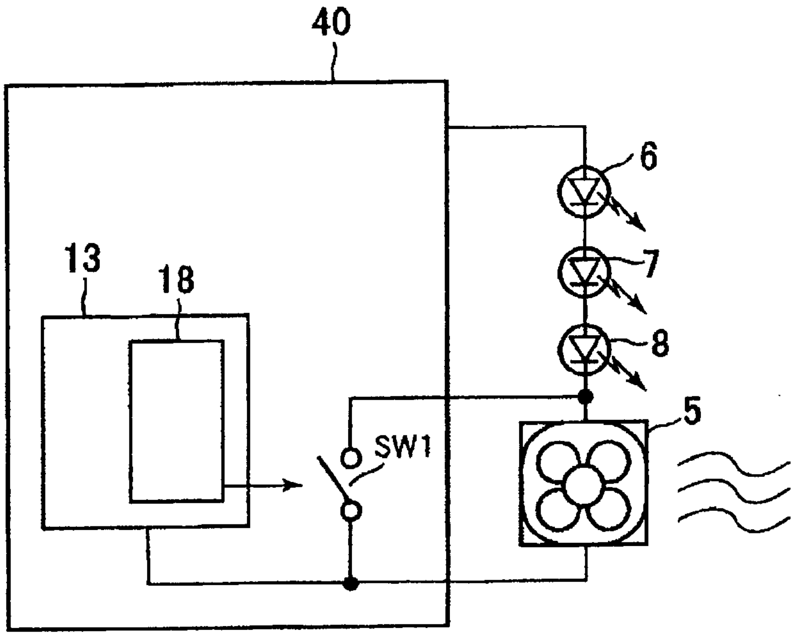
FIG. 5 shows the structure of the vehicular lamp according to a second embodiment of the present invention.

FIG. 5 shows the structure of the vehicular lamp according to the second embodiment of the present invention. The vehicular lamp 1 according to the second embodiment of the present invention includes switching means SW1 connected in parallel with the cooling fan 5. The configuration of the vehicular lamp 1 according to the second embodiment is otherwise identical to that of the first embodiment and, therefore, those details will not be repeated here.

In the case of the vehicular lamp 1 according to the first embodiment above, the magnitudes of current supplied to the LEDs 6, 7, 8 and the current flowing to the cooling fan 5 match. Therefore, the respective rated currents and light and wind amounts of the LEDs 6, 7, 8 and the cooling fan 5 may be constrained.

A cooling fan may be needed if a large amount of current is supplied to the LED (e.g., in the case of application to a head lamp). However, if the current to be supplied to the LED also is supplied without change to the cooling fan, the rated current of the cooling fan may be exceeded. In such a case, a cooling fan with a large rated current can be employed; however, a cooling fan with a small rated current is desired in order to reduce cost.

Hence, according to the second embodiment, the switch element SW1 (described below) is provided in the current supply circuit 40 to allow the mounting of cooling fans with various rated currents in the vehicular lamp according to the first embodiment above.

As FIG. 5 shows, the switch element SW1 is connected in parallel with the cooling fan 5. The switch element SW1 supplies current to the LEDs 6, 7, 8 and the cooling fan 5 during an OFF operation, and bypassing a current path to only the cooling fan 5 to stop the supply of current to the cooling fan 5 during an ON operation.

Although the switch element is shown as a simple switch, a semiconductor switch, such as a field effect transistor (FET), an insulated gate bipolar transistor (IGBT), or the like, is preferred.

A switch drive circuit 18 inside the control circuit 13 provides an ON/OFF signal (e.g. a high level signal or a low level signal) to the switch element SW1 for operating the switch element SW1 ON and OFF, and controls driving of the switch element SW1. Using FIG. 7 as an example, the switch drive circuit 18 controls switching of the switch element SW1 such that an on-duty is 80%.

At such time, a duty ratio of the switch element SW1 is set such that a magnitude of average current provided to the cooling fan 5 is equal to or less than a predetermined rated current.

For example, when the current (the LED current) to be sent to the LED is 1 ampere (A), and a rated current of 200 mA is desired for the cooling fan 5, then setting an off-duty of the switch element SW1 to 20% makes it possible to suppress the average current (the fan current) supplied to the cooling fan 5 to the above rated current. When the LED current is 1 A, and a rated current of 100 mA is desired for the cooling fan 5, then setting an off-duty of the switch element SW1 to 10% makes it possible to suppress the fan current to the above rated current.

Although the off-duty is set in the present embodiment, the on-duty may be set instead. If the off-duty is set to 20% in the foregoing example, setting the on-duty to 80% can obtain an identical effect. For an off-duty setting of 10%, the on-duty instead may be set to 90%.

Figure 6:
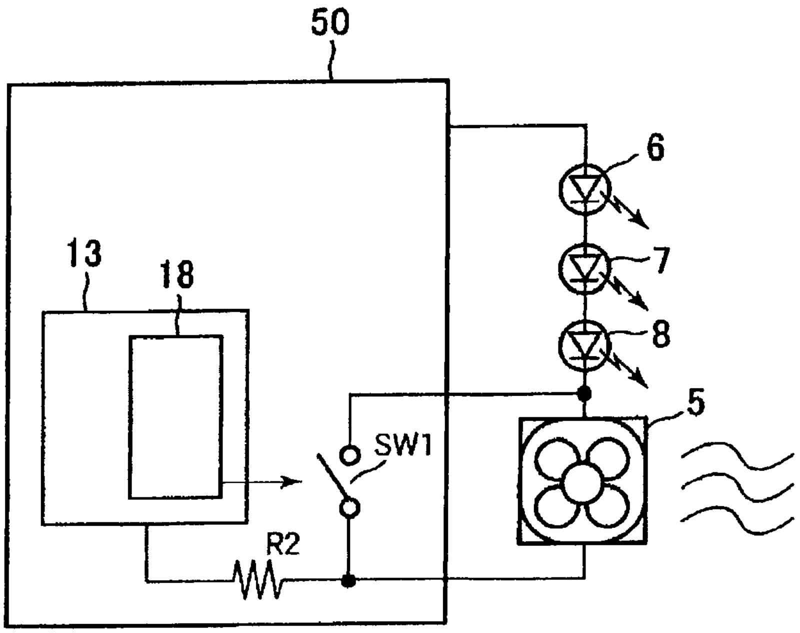
FIG. 6 shows the structure of the vehicular lamp according to a third embodiment of the present invention.

FIG. 6 shows the structure of the vehicular lamp according to the third embodiment of the present invention. The vehicular lamp according to the present embodiment includes the switch element SW1 connected in parallel with the cooling fan 5, and a shunt resistance R2 used as current detecting means provided on an end of the switch element SW1. The configuration of the vehicular lamp according to the present embodiment is otherwise identical to that of the first and second embodiments and, thus, those details will not be repeated here.

In the structure of the vehicular lamp 1 according to the second embodiment, in the event of an open abnormality such as a short circuit within at least one of the LEDs 6, 7, 8, the path for supplying current to the cooling fan 5 disappears, and the cooling fan 5 naturally stops. In the event of an open abnormality such as a short circuit only in the cooling fan 5, the LED current is still supplied to the LEDs 6, 7, 8, and the LEDs 6, 7, 8 repeatedly flash in ON/OFF operation cycles according to the setting of the duty ratio (a ratio of the on-duty to the off-duty) of the switch element SW1

Hence, even if an open abnormality, such as a short circuit, occurs in only the cooling fan 5, providing the shunt resistance R2 (which acts as a current detection circuit and will be described in further detail below) on an end of the switch element SW1 makes it possible to stop driving the LEDs 6, 7, 8.

Figures 7A, 7B, 7C:
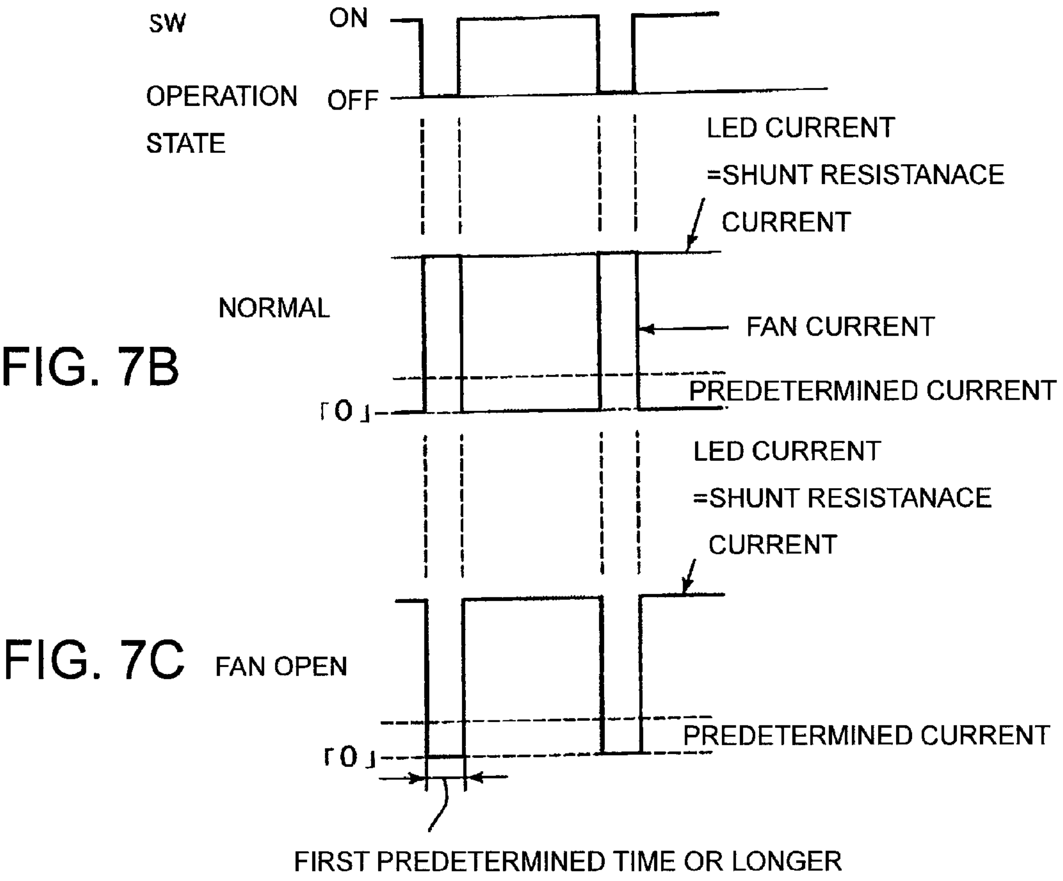
FIG. 7(A) is a waveform diagram showing an operation of a switch element SW1.
FIG. 7(B) is a waveform diagram for explaining an operation of the current supply circuit under normal circumstances.
FIG. 7(C) is a waveform diagram for explaining an operation of the current supply circuit when an open abnormality occurs only in the cooling fan.

An operation of the vehicular lamp according to the third embodiment is explained below with reference to FIGS. 7(A) to 7(C). FIG. 7(A) is a waveform diagram showing an operation of the switch element SW1. FIG. 7(B) is a waveform diagram for explaining an operation of the current supply circuit under normal circumstances (i.e., when there is no abnormality in either the LEDs 6, 7, 8 or the cooling fan 5). FIG. 7(C) is a waveform diagram for explaining an operation of the current supply circuit during an abnormality of the cooling fan 5 (i.e., when an open abnormality such as a short circuit occurs only in the cooling fan 5).

The shunt resistance R2 functions as current detecting means for detecting a current supplied to the LEDs 6, 7, 8. The current detection performed by the shunt resistance R2 involves detecting a voltage generated on both ends of the shunt resistance R2 as the current (the LED current or a shunt resistance current) supplied to the LEDs 6, 7, 8. In this manner, a monitoring signal indicating the magnitude of the detected LED current is fed back to the control circuit 13.

The control circuit 13 has a comparator (not shown) that judges whether the magnitude of LED current detected by the fed-back shunt resistance R2 is equal to or greater than a predetermined current value (a threshold value) specified in advance. The switch drive circuit 18 outputs an ON/OFF signal (e.g., a high level signal or a low level signal) for operating the switch element SW1 ON and OFF, and controls driving of the switch element SW1.

Under normal circumstances when the LEDs 6, 7, 8 and the cooling fan 5 are both operating normally and there are no abnormalities therein, the LED current (i.e., an output current from the current supply circuit) is substantially constant as shown in FIG. 7(B).

The fan current flows during an OFF operation of the switch element SW1 and does not flow during an ON operation of the switch element SW1. In addition, if the on-duty of the switch element SW1 is 80% as shown in FIG. 7(B), then the fan current is supplied to the cooling fan 5 at a duty of 20%.

Meanwhile, if the cooling fan 5 is open, then the LED current has an on-duty of 80%. The LED current does not flow during an OFF operation of the switch element SW1, and neither does the fan current. The present embodiment takes advantage of this characteristic. The waveform diagrams in FIGS. 7(B) and 7(C) show cases with an off-duty of approximately 20%.

If the magnitude of the LED current falls below the predetermined current value (the predetermined threshold value), then the fan current does not flow. Therefore, it is clear that some kind of abnormality has occurred in the cooling fan 5. The vehicular lamp according to the present embodiment detects such an abnormal state using the above current detection, and subsequently performs a control operation to stop driving of the cooling fan.

The control operation is now described in detail. The shunt resistance R2 constantly monitors the LED current, and if the magnitude of the LED current falls below the predetermined threshold value, then the control circuit 13 controls the switching regulator 11 so as to stop driving of the LEDs 6, 7, 8.

The predetermined threshold value may be an arbitrary value if the LED current is 1 A, and is preferably around 50% of the LED current or less.

Furthermore, an OFF operation time of the switch element SW1 must be equal to or longer than a detection time during which the shunt resistance R2 detects the LED current. This is because if the OFF operation time is shorter than the detection time, then it is not possible to detect the fact that the LED current is not being supplied.

If an ON/OFF cycle of the switch element SW1 is set to 100 Hz, for example, then the OFF operation time at an off-duty of 20% is 2 ms. Assuming an OFF operation time of 2 ms, the detection time must be less than 2 ms.

If the detection time used as the reference time is 1.5 ms, for example, and the preset threshold value is 0.5 A, for example, then the magnitude of the LED current detected by the shunt resistance R2 may fall below 0.5 A during the 1.5-ms detection time. In such a case, the control circuit 13 controls the switching regulator 11 so as to stop driving of the LEDs 6, 7, 8.

It should be noted that if the number of times the magnitude of the LED current falls below 0.5 A during the 1.5-ms detection time occurs a multitude of times (e.g., 100 times), then the driving of the LED may be stopped. However, if the magnitude falls below 0.5 A only once, for example, then the reason may be due to noise or the like, and therefore, falling below once may be judged as an abnormality. It is then necessary to carry out the abnormality judgment more than once to achieve a more precise judgment. Thus, a reduction in parts costs can be achieved, and when any one of the LEDs 6, 7, 8 and the cooling fan 5 experience an abnormality, the others can be stopped.

The embodiments described above are simply examples of preferred modes of the present invention, and various modifications are possible within the scope of the invention. In particular, other implementations are within the scope of the claims.

What is claimed is:

1. A vehicular lamp comprising:

a semiconductor light source;

a fan connected in series with the semiconductor light source and arranged to cool the semiconductor light source; and a current supply circuit arranged to receive power supplied from a power source and to supply current to the semiconductor light source and the fan, wherein the current supply circuit comprises:

a switch element connected in parallel with the fan and arranged to supply current to the semiconductor light source and the fan during an OFF operation, while bypassing only the fan and stopping a supply of current to be input to the fan during an ON operation; and a switch drive circuit arranged to drive the switch element, wherein a duty ratio of the switch element is set such that a magnitude of an average current to be provided to the fan is equal to or less than a predetermined rated current.

2. The vehicular lamp according to claim 1 wherein the current supply circuit is arranged to stop the output current if a state in which a magnitude of the output current detected by the resistance is less than a preset threshold value continues for a predetermined reference time, and the reference time is less than an OFF operation time of the switch element.

3. The vehicular lamp according to claim 2 wherein the current supply circuit includes a comparator to determine whether the magnitude of the output current detected by the resistance is less than the preset threshold value.

4. The vehicular lamp according to claim 3 wherein the current supply circuit has a current detection circuit arranged to detect an output current to be supplied from the current supply circuit, wherein the current supply circuit is arranged to stop the output current if a state in which a magnitude of the output current detected by the current detection circuit is less than a preset threshold value continues for a predetermined reference time, and the reference time is less than an OFF operation time of the switch element.

* * * * *